United States Patent Office 3,399,847
Patented Sept. 3, 1968

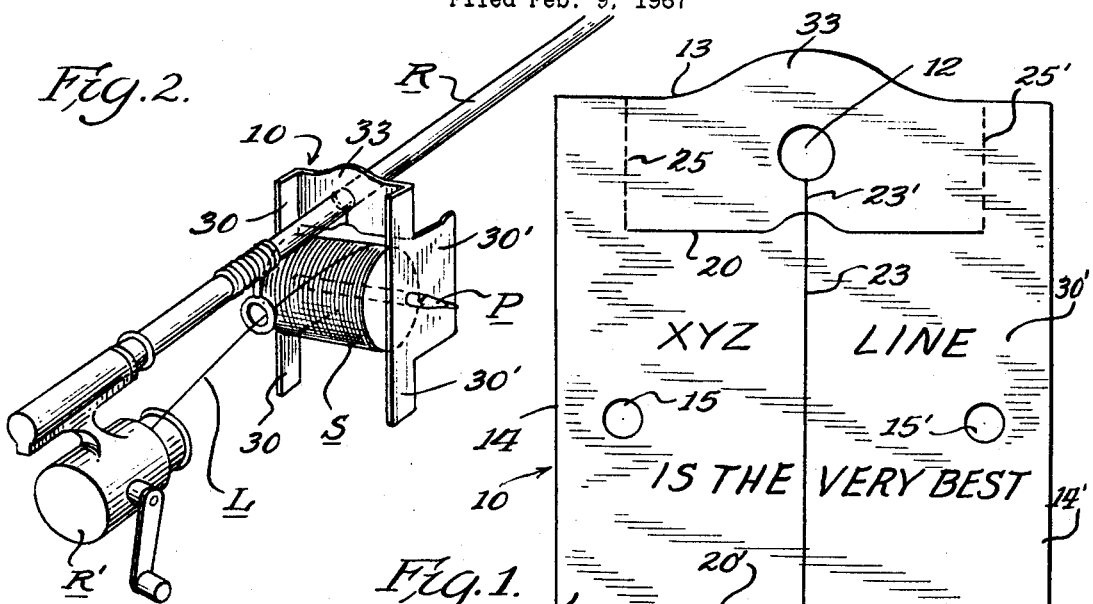

3,399,847
FISHING LINE SPOOL HOLDER
Arthur R. Slate, Chicago, Ill., assignor to Sears, Roebuck and Co., Chicago, Ill., a corporation of New York
Filed Feb. 9, 1967, Ser. No. 614,914
6 Claims. (Cl. 242—129.6)

ABSTRACT OF THE DISCLOSURE

A spool holder for fishing line designed to support a spool on a rod while line is transferred to a reel also mounted on the rod, thus avoiding twisting of the line, said holder being formed of a sheet of inexpensive sheet material such as cardboard capable of displaying advertising matter, and having weakened portions permitting the user to deform the sheet to operable form, with means for mounting the holder on a fishing rod and also having means for supporting a spool.

---

My invention relates to a holder for a fishing line spool adapted to be produced at a minimum of cost and intended to solve a common problem in transferring a line from the spool on which it is sold to the fisherman's reel.

The usual fisherman, after purchasing a new line, must transfer it from its spool to his reel. Such an operation is troublesome and awkward, usually being accomplished by throwing the spool on the floor or on an article of furniture and then winding it up on the reel. Inevitably, the line becomes twisted and warped in such an operation, which is highly undesirable from the standpoint of accurate casting.

I have conceived of a device which may be produced at such a modest cost that it may economically be dispensed as a "give-away" to the retail trade for advertising or promotional purposes in the sale of fishing line or other fishing equipment.

An object of my invention, therefore, is to produce a support for a spool of fishing line which may be fabricated out of a sheet of inexpensive material such as cardboard, laminated or so-called "composition" material, which is relatively inexpensive and which is prepared by a stamping or like operation with certain weakened areas or other deformations which will permit the purchaser to distort the sheet manually out of planar form and quickly convert it into a spool holder adapted to be mounted on a fishing rod. There a fishing-line spool is conveniently mounted on the holder and the line from said spool is then attached to and wound onto a reel likewise mounted on the rod without twisting.

A further object of my invention is to provide a holder of the type referred to which is deformed to provide an aperture for a fishing rod and also to provide a pair of spaced apertures serving to seat a spindle for a spool after the holder has been distorted and mounted on a fishing rod.

Another important object of my invention is to fabricate a holder of the type referred to out of such material that it will be readlly suited as a base for the imprinting of advertising copy and may be packed in flat condition with a spool of fishing line or other equipment, so that a retail purchaser of the line will have an advertising or promotional message conveyed to him immediately upon unpacking the fishing line package.

Various other objects and advantages will doubtless suggest themselves to those skilled in the art as the description proceeds.

Referring now to the drawings forming a part of this specification and illustrating certain preferred embodiments of my invention, FIG. 1 is a plan view of a prepared blank from which a spool holder is formed in one embodiment of my invention;

FIG. 2 is a perspective view of the embodiment shown in FIG. 1 after it has been distorted by the user and mounted on a fishing rod, this figure showing the spool holder in use in the course of transferring line from a spool to a reel also mounted on the rod;

FIG. 3 is a plan view showing another form of prepared blank for a spool holder, representing another embodiment of my invention, and FIG. 4 is a perspective view showing the holder formed from the blank of FIG. 3 with a spool of fishing line mounted thereon.

Referring first to the embodiment of FIGS. 1 and 2, the numeral 10 indicates a blank which is preferably stamped out of suitable sheet material having the desired characteristics. Thus, it should be relatively inexpensive, in order that it may be dispensed as a free gift in connection with the merchandising of fishing line or other fishing equipment. Also, sheet 10 should be relatively stiff in order that it will provide the necessary support to perform its function, while at the same time it should be readily workable and deformable, as hereinafter described. The material should also be capable of being imprinted with a desired advertising or promotional message. In addition to cardboard, a relatively thin but fairly stiff foil of metal, plastic or the like, or a suitable inexpensive laminated or "composition" sheet may be employed.

Sheet 10 is preferably rectangular, being somewhat longer in its vertical than in its transverse or horizontal dimension and of such size and proportions as to meet the functional requirements hereinafter described.

A perforation 12 is provided adjacent the upper end of sheet 10, this perforation being of such a size that it will conveniently and snugly receive a fishing rod R, as seen in FIG. 2. Although the upper edge 13 is shown as having an arcuate mid-portion, this contour is primarily decorative and is not required.

A pair of spaced perforations 15, 15' is provided intermediate the ends 13 and 13' of sheet 10. Although these perforations are shown as approximately midway between the upper and lower edges of sheet 10, this condition is not an essential requirement, nor is the spacing of perforations 15, 15' from the side edges 14, 14' of the sheet.

The sheet is scored or weakened in certain lines, as now described. Thus, a generally horizontal score line 20 is provided a relatively short distance below aperture 12, this score line beginning and ending inwardly of side edges 14 and 14'. Although score line 20 is shown as having a central arcuate portion directly below aperture 12, this contour is also primarily decorative.

Another horizontal score line 20' is provided generally parallel to score line 20 and spaced inwardly from bottom edge 13' of the sheet. Score line 20', as seen clearly in FIG. 1, is preferably a projection of score line 20 in that it is of substantially the same length and spaced substantially the same distance inwardly from the side edges 14 and 14'.

A vertical score line 23 is provided substantially down the middle of sheet 10, joining score lines 20 and 20' and also preferably having a relatively short extension 23' between score line 20 and aperture 12.

I wish it to be clearly understood that, while I prefer to provide continuous scored lines as described hereabove, permitting the adjacent portions of the sheet to be readily separated, my invention might be satisfactorily practiced by substituting for such continuous lines interrupted scored or perforated lines so that, in any event, the card is weakened along these lines and thus permits convenient manual separation. Accordingly, where I have used the term "weakened lines" in the claims, this terminology should be understood as indicating either a continuous or a discontinuous line of scoring or cutting.

To permit hinging of the sheet along certain lines, I provide weakened lines 25, 25' extending upwardly from the extremities of score line 20 to the upper edge of the sheet and also weakened lines 27, 27' extending downwardly from the extremities of score line 20' to bottom edge 13'. Line 27 is in line with line 25 and 27' with 25'.

It will also be noted from the lettering appearing on the card or sheet in FIG. 1 that, in the course of fabrication, and desired advertising or promotional matter may be imprinted on the sheet, thus economically justifying the dispensing of the item as a "giveaway" in conjunction with the sale of line or other fishing equipment.

In using the article just described, the consumer separates the two sides of the card or sheet along the weakened lines 23, 20 and 20', so that it takes the form seen in FIG. 2, with a pair of lateral wing portions 30, 30' disposed in generally parallel planes and connected by means of a top cross-bar portion 33. Whether or not the bottom portion 35 extending between wings 30 and 30' is removed is immaterial; as seen in FIG. 2, this web portion may be manually eliminated. In any event, the lower extensions of wings 30, 30' serve to support the holder on a table or other horizontal surface.

Either before or after the sheet or card has been so distorted, it is affixed onto a fishing rod to assume a position substantially as shown in FIG. 2, with the rod passing through aperture 12 and the support slid up upon the rod to a position where the latter will substantially fill the aperture and become wedged therein, thus preventing undesirable movement of the device in the course of the reeling operation. To attach the holder to the rod, the latter may conveniently be pushed upwardly through the short score line 23'.

The device is now ready to support a spool of fishing line, and attachment thereof to the support is readily provided by using as a spindle or axle P any handy article such as a pencil, spike or twig.

The line L carried by spool S is then fixed in the usual manner to reel R and the user then proceeds to wind the line onto the reel in the usual manner.

Obviously, in this procedure, the line is fed from the spool onto the reel with a complete lack of twisting, tension or warping.

As seen in FIG. 2, the positioning of apertures 15 and 15' relative to the side edges of the sheet is immaterial, and these apertures could be practically anywhere between the edges 14, 14' and the scored line 23, as in practically any position these apertures 15 and 15' will serve to support the spindle P.

Referring now to the embodiment shown in FIGS. 3 and 4, I provide here a sheet or card 10a which may be generally similar in size and shape to sheet 10 of the embodiment described hereabove. Here again I provide near the top a central aperture 12a and I also provide a pair of spaced apertures 40, 40' approximately midway between the top and bottom edges of the sheet.

I also provide a pair of generally horizontal weakened or scored lines 42, 42' spaced apart as in the former embodiment, and a generally vertical weakened or scored line 45 extending between scored lines 42 and 42', said vertical line extending to aperture 12a in short scored line 45'.

Hinge means is provided in the weakened lines 50, 50' extending between scored lines 42, 42'.

As seen in FIG. 4, the use of this embodiment of my invention is substantially similar to that of the former embodiment, wings 52, 52' being bent outwardly along their hinges 50, 50'.

In this last described embodiment it is essential that the spindle apertures 40, 40' be disposed somewhere between the hinge lines 50, 50' and the vertical scored line 45.

It will be seen that I have provided an extremely inexpensive device which may not only serve a useful and important function in facilitating the transfer of fishing line from a spool to a reel without twisting, but also will serve as a convenient advertising medium, and that the invention may be practiced in a variety of forms.

Various other changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A holder for supporting a spool of line while being wound onto a fishing reel, comprising:
   (a) a sheet of relatively stiff but readily deformable material of generally rectangular configuration,
   (b) said sheet having a perforation adjacent one end in the mid-portion thereof to provide a passage for a fishing rod, and also having a pair of perforations spaced intermediate the top and bottom ends of the sheet and laterally of the center line to permit passage of a spindle for supporting a spool,
   (c) said sheet also having weakened lines to permit separation and bending of portions of said sheet along said lines to provide a pair of opposed vertical transverse wings containing said lateral perforations,
   (d) whereby, when said wings are extended, a space for a spool is provided therebetween and a spindle may be passed through said lateral perforations to support a spool.

2. A spool holder as in claim 1, wherein:
   (a) a pair of said weakened lines are generally parallel and another weakened transverse line joins said parallel lines approximately midway of the length thereof, to form parting lines defining said wings,
   (b) said sheet being also weakened adjacent the extremities of said parallel lines to provide hinges for the wings.

3. A spool holder as in claim 2, wherein:
   (a) said rod-receiving perforation is spaced between one of said parallel weakened lines and the adjacent end of the sheet, and
   (b) a relatively short weakened line extends between said rod-receiving perforation and the adjacent one of said parallel weakened lines, to permit access to said rod-receiving perforation by trans-axial movement of the rod.

4. A fishing line spool holder, comprising:
   (a) a pair of spaced, generally parallel wings each having a deformation for rotatably supporting a spool therebetween, and
   (b) a web portion connecting said wings and spaced from said deformations, said web portion having a deformation for detachably mounting said holder on a fishing pole.

5. A holder as in claim 4, formed of relatively stiff, manually deformable sheet material, said deformations being apertures.

6. A holder as in claim 4, wherein said sheet material is of the character of cardboard.

References Cited

UNITED STATES PATENTS

| | | | |
|---|---|---|---|
| 2,048,307 | 7/1936 | Weber | 242—146 |
| 2,527,401 | 10/1950 | Daoust | 206—59 |
| 3,298,127 | 1/1967 | Bedell | 43—25.2 |

LEONARD D. CHRISTIAN, *Primary Examiner.*